United States Patent [19]

Suzuki et al.

[11] 4,408,856
[45] Oct. 11, 1983

[54] DEVICE FOR LOCKING A BLADE DRIVER IN AN ELECTRONIC SHUTTER

[75] Inventors: Akira Suzuki; Yukio Yoshikawa, both of Tokyo; Katumi Kaneko, Ageo, all of Japan

[73] Assignee: Copal Company Limited, Tokyo, Japan

[21] Appl. No.: 326,633

[22] Filed: Dec. 2, 1981

[30] Foreign Application Priority Data

Dec. 9, 1980 [JP] Japan .............................. 55-177401[U]
Feb. 2, 1981 [JP] Japan .............................. 56-13399[U]
Feb. 25, 1981 [JP] Japan .............................. 56-26233[U]

[51] Int. Cl.³ .............................................. G03B 9/08
[52] U.S. Cl. .................................... 354/234; 354/246; 354/268
[58] Field of Search ............... 354/234, 235, 241, 242, 354/245, 246, 247, 248, 249, 250, 266, 268

[56] References Cited
U.S. PATENT DOCUMENTS 4,306,793 12/1981 Date et al. ........................... 354/234

Primary Examiner—Alan Mathews
Attorney, Agent, or Firm—Wolder, Gross & Yavner

[57] ABSTRACT

A shutter blade is actuatable by a driver which can be locked in a shutter setting position by a locking lever assembly comprising a first lever having a bent end engageable with the driver and a second lever having an iron member attractable by an electromagnet which, when energized, causes the first and second levers to be angularly moved in unison in a direction to release the driver for actuating the shutter blade. The second lever is lockable against movement to actuate the driver by a reciprocable follower movable in response to operation of a quick return mirror mechanism. When a shutter button is depressed to move the mirror upwardly for starting an exposure operation, the second lever is disengaged from the follower, and attracted by the electromagnet as energized to release the driver. When the exposure operation is finished, the mirror is lowered to enable the follower to lock the second lever against movement. The first lever is then in a position capable of locking the driver in the shutter setting position.

5 Claims, 13 Drawing Figures

PRIOR ART

DEVICE FOR LOCKING A BLADE DRIVER IN AN ELECTRONIC SHUTTER

BACKGROUND OF THE INVENTION

1. Field of the Invention

The present invention relates to a device for locking a blade driver in an electronic shutter, and more particularly to such a locking device which is attractable by an electromagnet when energized to release a shutter driver from locked engagement for rendering shutter blades actuatable and which, after a picture has been taken, is actuatable for locking the shutter driver as returned to its starting position in a shutter setting operation.

2. Description of the Prior Art

A conventional device for locking a blade driver in an electronic shutter comprises an electromagnet and a locking lever normally urged by a spring away from the electromagnet for locking the blade driver before the shutter blades are actuated. When the electromagnet is energized, the locking lever is attracted to the electromagnet against the bias of the spring, unlocking the blade driver which will then actuate the shutter blades. With such a prior arrangement, the electromagnet should be large in capacity enough to move the locking lever against the resiliency of the spring, and the device has been large in size. One way to make the device smaller in size would be to utilize a smaller spring to bias the locking lever. However, the smaller the spring, the greater the tendency for the locking lever to be accidentally turned under shocks applied to the camera, unlocking the shutter driver.

SUMMARY OF THE INVENTION

With the prior difficulties in view, it is an object of the present invention to provide a device for locking a shutter blade driver in an electronic shutter, the device including a locking lever which is attractable by a relatively small-sized electromagnet and will be prevented from being released due to shock or vibration imposed on the camera to avoid the risk of the camera's being accidentally actuated for an exposure operation.

According to the present invention, a locking lever assembly for locking a shutter driver is operatively associated with a reciprocable member movable in one direction before an exposure operation is started and in an opposite direction in response to completion of the exposure operation, the locking member being prevented from accidental displacement to unlock the shutter driver when the reciprocable member is at rest. The locking lever assembly comprises a first lever having an engaging portion engageable with the shutter driver and a second lever having an iron member attractable by an electromagnet to unlock the shutter driver, the first and second levers being operatively coupled with each other by a return spring, and the second lever being actuatable by the reciprocable member. When the shutter is to be set, the shutter driver can easily be moved into engagement with the first lever as the latter is angularly moved against the force of the return spring, with the second lever being locked in position by the reciprocable member operatively associated with a quick return mirror mechanism as the mirror is in a downward position. When a shutter button is depressed to take a picture, the mirror is moved upwardly, the second lever is unlocked, and then the first and second levers are turned in unison under the attractive force of the electromagnet until the shutter driver is released. The first and second levers can easily be angularly moved with a relatively small force since no resistive force is imposed on the levers when they are disengaged from the reciprocable member.

The above and other objects, features and advantages of the present invention will become more apparent from the following description when taken in conjunction with the accompanying drawings in which some preferred embodiments of the invention are shown by way of illustrative example.

DETAILED DESCRIPTION

Figure 1:
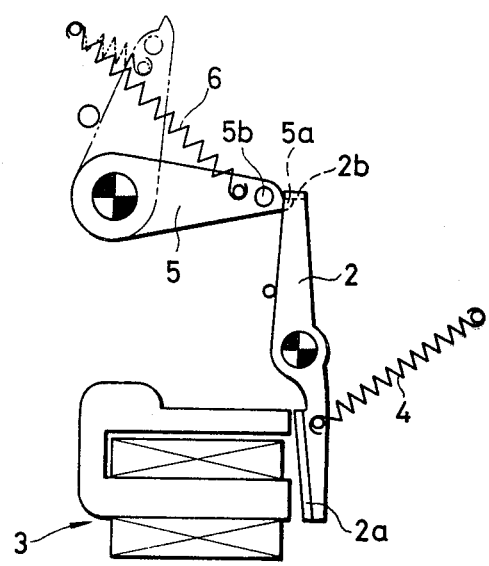
FIG. 1 is a schematic plan view of a conventional blade driver locking device.

A known device for locking a shutter blade driver is shown in FIG. 1 and comprises a locking lever 2 having an iron member 2a and an electromagnet 3 which, when energized, attracts the iron member 2a to turn the locking lever 2 clockwise against the bias of a spring 4 until a bent end 2b of the locking lever 2 is moved out of engagement with a hook 5a of a shutter blade driver lever 5. The driver lever 5 is then caused by a spring 6 to turn counterclockwise toward the two-dot-and-dash line position, whereupon shutter blades or leaves (not shown) are actuated by a pin 5b on the lever 5. After a picture has been taken, the driver lever 5 is turned in a shutter setting operation clockwise from the two-dot-and-dash line position against the bias of the spring 6 until the hook 5a pushes at its back the bent end 2b of the locking lever 2 (which has been returned to its starting position upon de-energization of the electromagnet 3) to cause the latter to swing clockwise. As the hook 5a moves past the bent end 2b, the locking lever 2 is turned counterclockwise under the force from the spring 4 to enable the bent end 2b to lock the hook 5a. The parts of the device are now set in the position shown in FIG. 1.

With the prior arrangement described above, the electromagnet 3 as energized is required to attract the locking lever 2 against the resiliency of the spring 4, and hence to produce a relatively large attractive force. The device with such electromagnet is not preferable as it is relatively large in size. Where a smaller electromagnet is used, the spring 4 should provide as small a tensile force as possible. Where the spring 4 is weaker, the locking lever 2 has a greater tendency to turn clockwise accidentally due to shock imposed on the camera in which the device is incorporated, a condition which will allow the blade driver 5 to be released at times of locked engagement with the locking lever 2. When the blade driver 5 is thus accidentally released and the user has not noticed such unwanted releasing of the blade driver 5, it is highly likely for the user to fail to take a picture at what he thinks to be a shutter chance. The blade driver 5 once accidentally released cannot sometimes be reset easily. Where the device is ganged with a mechanism for winding a film resetting the blade driver 5 also actuates such a mechanism with the result that one film exposure is wasted.

A device for locking a shutter blade driver according to an embodiment of the present invention will now be described.

Figure 2:
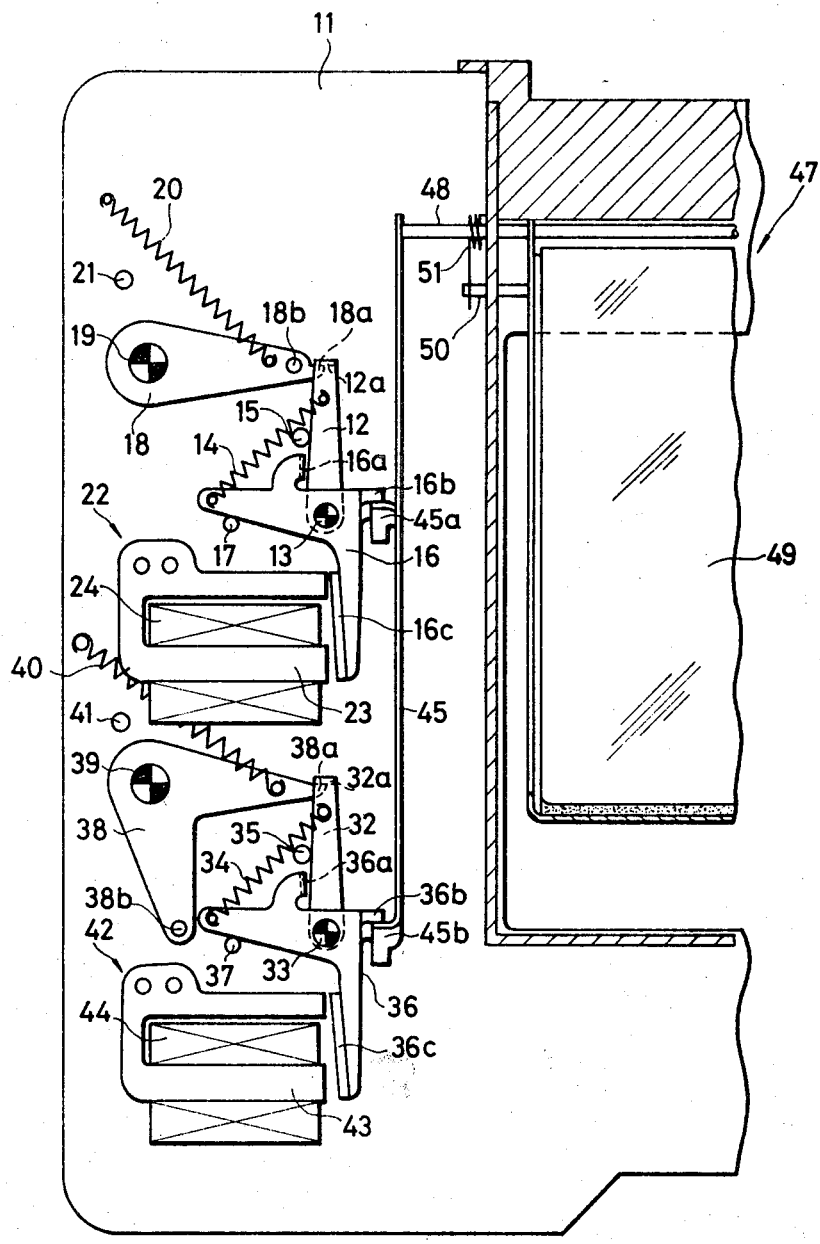
FIG. 2 is a plan view of a blade driver locking device according to the present invention.

FIG. 2 shows a locking device of the present invention, the parts being shown to be in the position in which a shutter is set. A locking lever or first lever 12 for a front shutter blade or leaf has a bent end 12a and is pivotably mounted on a shaft 13 attached to a base plate 11. The locking lever 12 is normally urged to turn counterclockwise into abutment against a stopper 15 by a return spring 14 acting between the locking lever 12 and a second lever 16 for the front shutter blade. The second lever 16 comprises bent portions 16a, 16b and an iron member 16c and is pivotably mounted on the shaft 13. The second lever 16 is normally urged by the spring 14 to turn clockwise into abutment against a bent portion 45a of a lock or follower lever 45 later described.

A driver lever 18 for the front shutter blade has a hooked end 18a and a pin 18b located adjacent thereto for actuating the front shutter blade. The driver lever 18 is angularly movably mounted on a shaft 19 projecting from the base plate 11 and is normally biased in a direction to swing counterclockwise by a spring 20 but prevented from such counterclockwise rotation as long as the hooked end 18 is engaged by the bent end 12a of the locking lever 12. When the hooked end 18 is released of engagement with the bent end 12a, the driver lever 18 is caused under the bias of the spring 20 to angularly move into abutment against a stopper 21 mounted on the base plate 11.

An electromagnet 22 for the first shutter blade is mounted on the base plate 11 and disposed adjacent to the second lever 16. The electromagnet 22 comprises an iron core 23 fixed to the base plate 11 and a coil 24 disposed around the iron core 23.

A locking lever or first lever 32 for a rear shutter blade or leaf has a bent end 32a and is pivotably mounted on a shaft 33 attached to the base plate 11. The locking lever 32 is normally urged to turn counterclockwise into abutting engagement with a stopper 35 by a return spring 34 acting between the locking lever 32 and a second lever 36 for the rear shutter blade. The second lever 36 comprises bent portions 36a, 36b and an iron member 36c and is angularly movably mounted on the shaft 33. The second member 36 is normally urged by the spring 34 to turn clockwise into abutment against a bent portion 45b of the lock lever 45.

A driver lever 38 for the rear shutter blade has a hooked end 38a and a pin 38b located remotely therefrom for actuating the rear shutter blade. The driver lever 38 is angularly movably mounted on a shaft 39 projecting from the base plate 11 and is normally biased in a direction to swing counterclockwise by a spring 40, but prevented from such counterclockwise rotation as long as the hooked end 38a is engaged by the bent end 32a of the locking lever 32. When the hooked end 38a is disengaged from the bent end 32a, the driver lever 38 is caused by the spring 40 to angularly move into abutment against a stopper 41 mounted on the base plate 11.

An electromagnet 42 for the rear shutter blade is mounted on the base plate 11 and disposed adjacent to the second lever 36. The electromagnet 42 comprises an iron core 43 fixed to the base plate 11 and a coil 44 disposed around the iron core 43.

Figure 6:
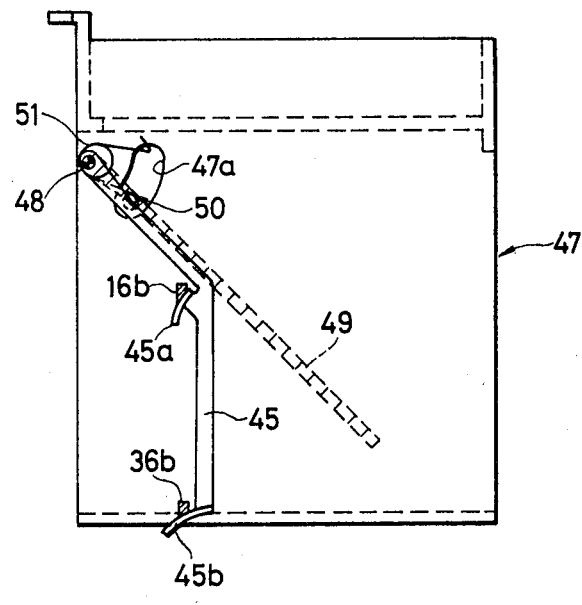
FIG. 6 is a side elevational view of the device of FIG. 2.

The lock lever 45 with the bent portions 45a, 45b spaced from each other is rotatably attached by a shaft 48 to a mirror box 47. The mirror box 47 is mounted on the base plate 11 and has a window 47a (FIG. 6) defined in a side plate thereof. The mirror box 47 comprises the shaft 48, a mirror 49 attached to the shaft 48, a pin 50 extending laterally from the mirror 49, and a torsion spring 51 disposed around the shaft 48. As illustrated in FIG. 6, the mirror 49 is normally inclined at an angle of 45 degrees under the resiliency of the torsion spring 51, and constitutes part of a finder optical system.

Figure 3:
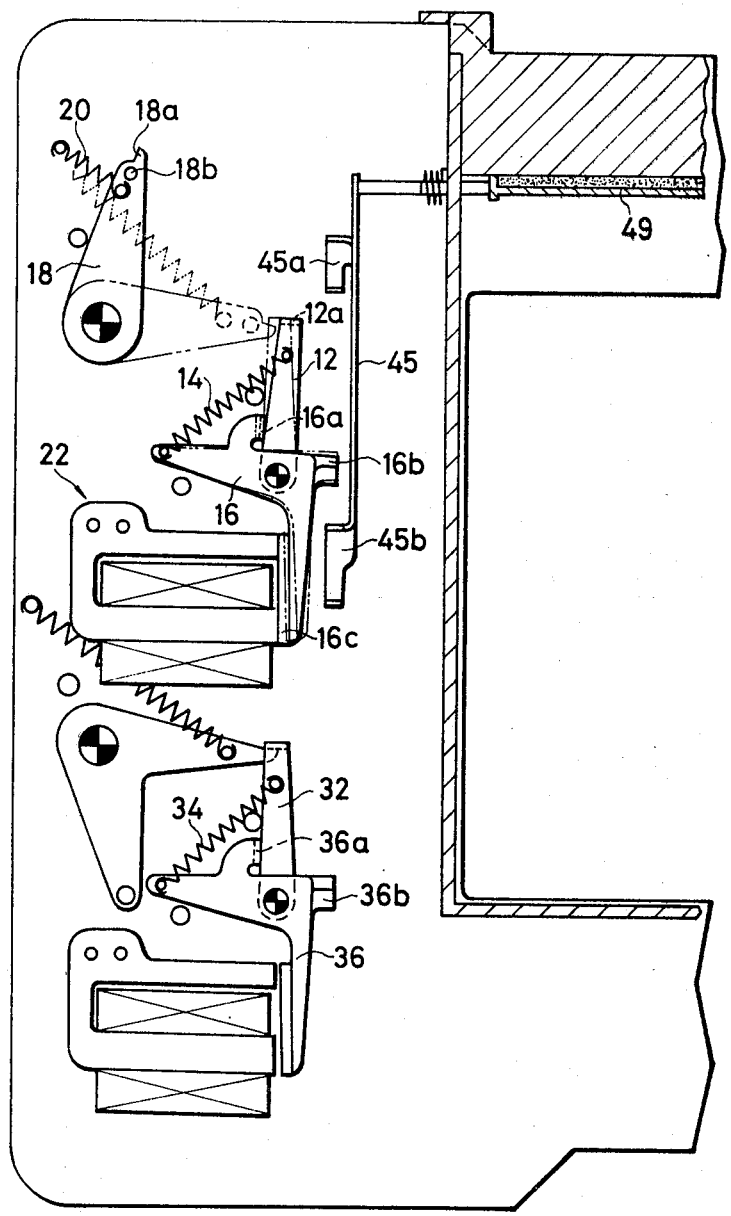
FIGS. 3 through 5 are plan views illustrative of the way in which the blade driver locking device shown in FIG. 2 operates.
Figure 7:
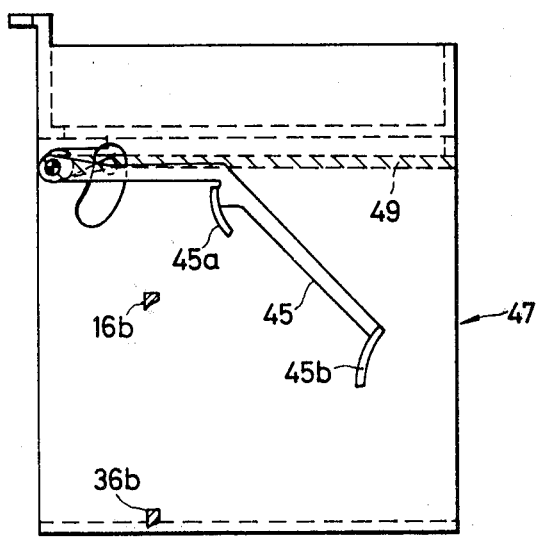
FIG. 7 is a side elevational view of the device as actuated.

The device thus constructed will operate as follows: When a shutter button is depressed while the parts are in the position of FIG. 2, the mirror 49 is lifted thereby raising the lock lever 45 (FIG. 3), which is angularly moved counterclockwise with the mirror 49 as shown in FIG. 7. At this time, the bent portions 45a, 45b of the lock lever 45 are retracted upwardly to release the bent portions 16b, 36b of the second levers 16, 36, respectively, which are then caused by the springs 14, 34 to turn clockwise until the bent portions 16a, 36a are held against the locking or first levers 12, 32, respectively. The portions of the second levers 16, 36 are shown by the two-dot-and-dash lines and the solid lines, respectively, in FIG. 3.

Continued depression of the shutter button actuates a switch by which the electromagnet 22 is supplied with a pulse signal and hence is momentarily energized to attract the iron member 16c on the second lever 16, which is angularly moved clockwise to cause the bent portion 16a to push the locking lever 12 clockwise until the bent end 12a thereof is displaced out of engagement with the hooked end 18a of the driver lever 18. Thus released, the driver lever 18 is angularly moved counterclockwise under the force of the spring 20, whereupon the front shutter blade is actuated by the pin 18b, thereby opening the aperture to start an exposure operation. At this time, the parts are in the solid-line position shown in FIG. 3.

Figure 4:
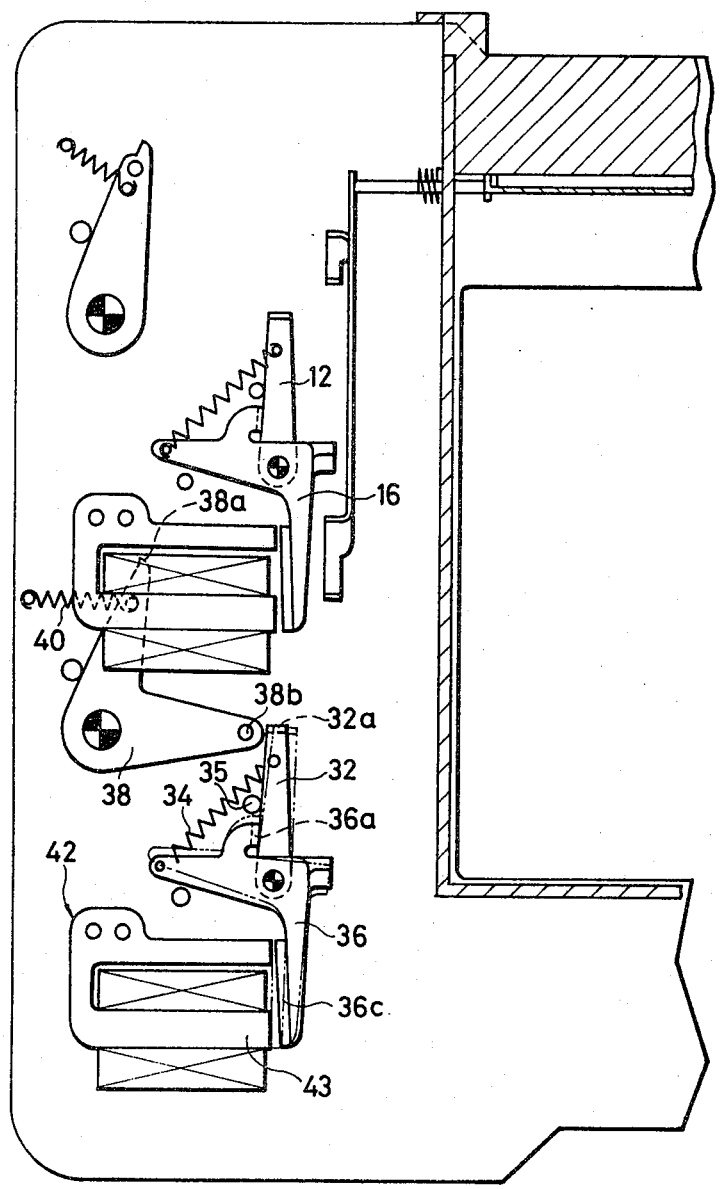

Upon elapse of a correct exposure time, the electromagnet 42 is fed with a pulse signal so as to be energized momentarily, whereupon the iron member 36c is attracted to the electromagnet 42. The second lever 36 is turned clockwise to the two-dot-and-dash line position shown in FIG. 4, during which time the bent portion 36a pushes the locking lever 32 clockwise. The bent end 32a is now displaced out of engagement with the hooked end 38a, whereupon the driver lever 38 is caused by the spring 40 to swing counterclockwise to cause the pin 38b to actuate the rear shutter blade. The aperture is now closed by the rear shutter blade, finishing the exposure operation.

When the electromagnet 42 is energized, the iron member 36c on the lever 36 is attracted to the iron core 43 and held thereagainst. However, the locking lever 32 is caused to overrun or turn overly, thus charging the spring 34. Then, the locking lever 32 is swung back counterclockwise by the energy stored in the spring 34 until the locking lever 32 abuts against the pin 35. At this time, the lever 36 is pushed back by the locking lever 32 toward the solid-line position illustrated in FIG. 4. The locking lever 12 and the lever 16 for the front shutter blade are also subjected to such movements.

Figure 5:
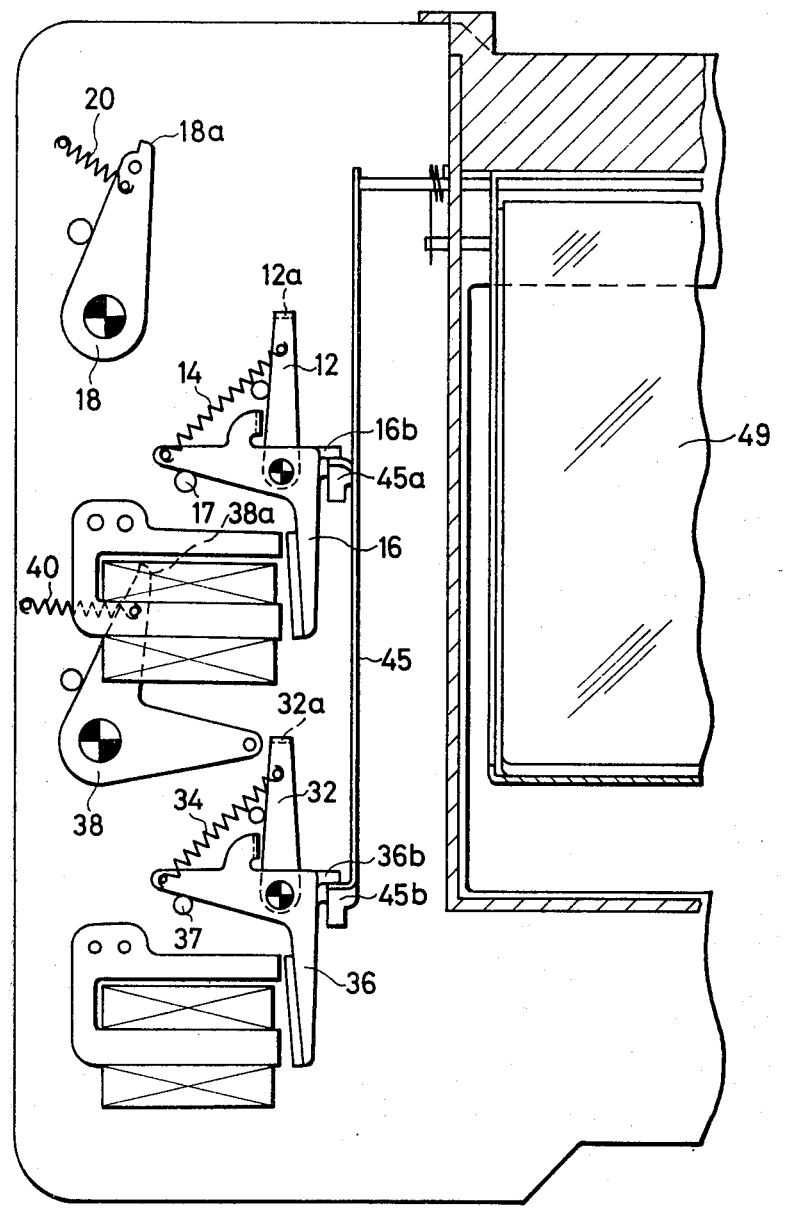

The mirror 49 is then lowered to the position of FIG. 6 in response to a signal indicative of the completion of the exposure operation, such as the counterclockwise movement at a final stage of the driver lever 38. As the mirror 49 is turned clockwise as shown in FIG. 6, the lock lever 45 is also turned clockwise enabling the bent portions 45a, 45b to push the bent portions 16b, 36b, respectively, until the levers 16, 36 are locked in position by the bent portions 45a, 45b and stoppers 17, 37 mounted on the base plate 11 as illustrated in FIG. 5. The levers 16, 36 thus locked are prevented from either clockwise or counterclockwise movement.

After the picture has been taken, the film is wound in order to set the shutter, whereupon the driver levers 18, 38 are turned clockwise against the bias of the springs 20, 40, respectively, until the hooked ends 18a, 38a push at their back the bent ends 12a, 32a and get past them as the locking levers 12, 32 are slightly turned clockwise. When the hooked ends 18a, 38a are past the bent ends 12a, 32a, respectively, the locking levers 12, 32 are angularly moved back in the counterclockwise direction under the force of the springs 14, 34, respectively. Upon releasing the force with which the shutter is set, the driver levers 18, 38 are turned counterclockwise under the bias of the springs 20, 40, respectively, until the hooked ends 18a, 38a are engaged respectively by the bent ends 12a, 32a. The driver levers 18, 38 are now in the set position illustrated in FIG. 2.

The present invention is not limited to the foregoing embodiment, but may be modified in various ways. For example, the levers 16, 36 may be dispensed with and the locking levers 12, 32 may be of a configuration similar to that of the locking lever 2 as shown in FIG. 1 and may be structured for coaction with the lock lever 45.

With the arrangement of the present invention, the locking levers 12, 32 are prevented by the lock lever 45 from being accidentally displaced out of locking engagement with the driver levers 18, 38, respectively, due to shock and vibration while the lock lever 45 remains at rest before and after exposure operation is effected. When the lock lever 45 unlocks the locking levers 12, 32 in response to lifting movement of the mirror 49, the locking levers 12, 32 and the levers 16, 36 associated respectively therewith are rendered freely movable on the shafts 13, 33 and hence can be attracted with a small attractive force by the electromagnets 22, 42 when the latter are energized.

Figure 8:
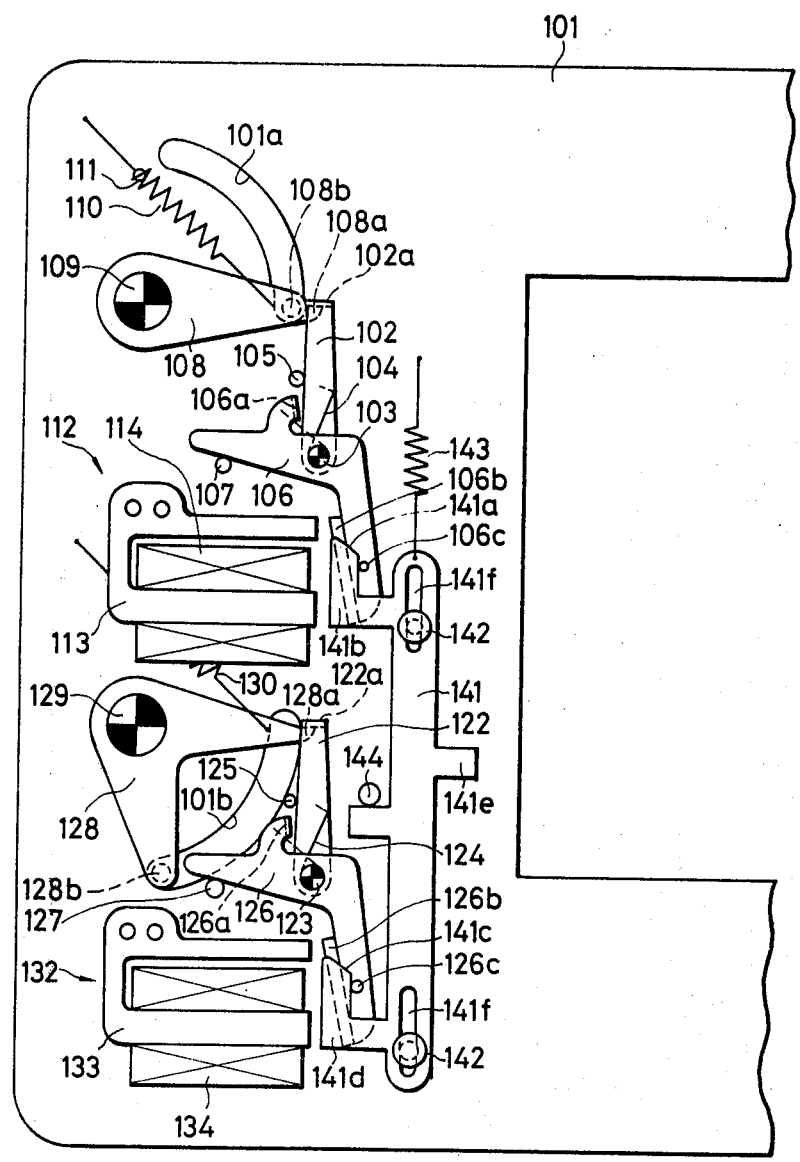
FIG. 8 is a plan view of a blade driver locking device in accordance with another embodiment of the present invention.
Figure 9:
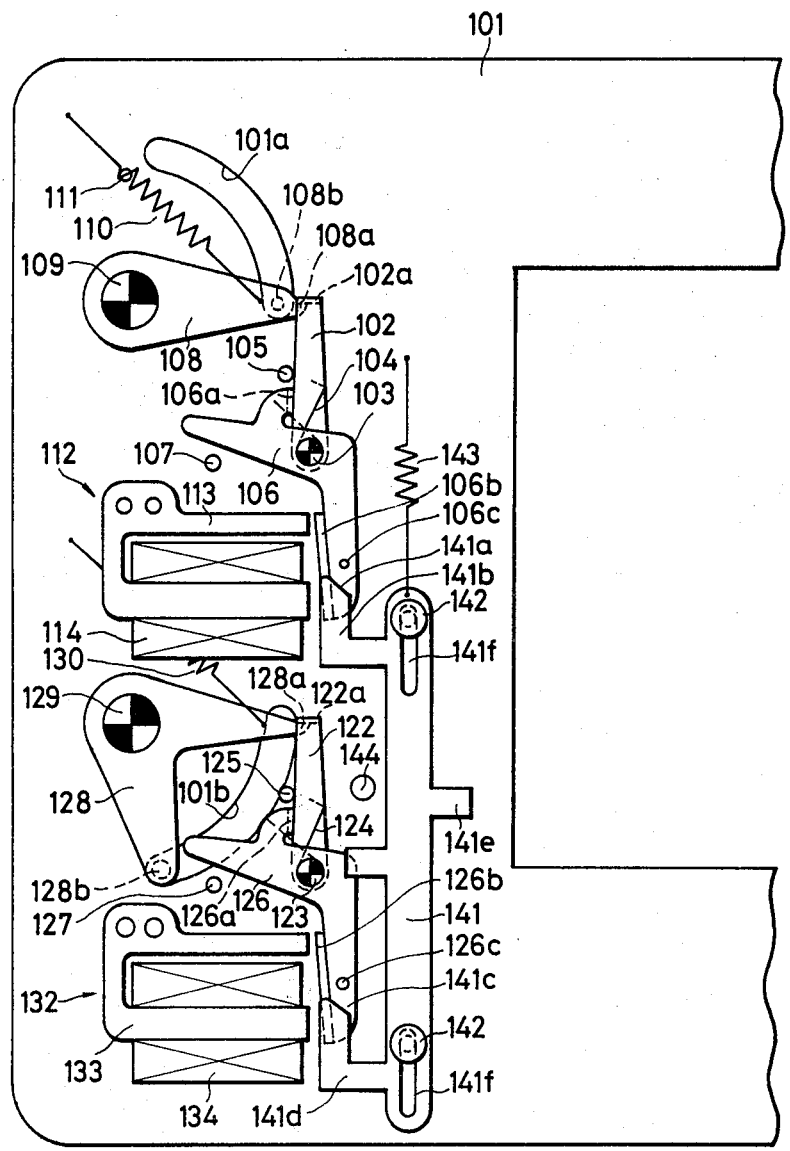
FIGS. 9 through 12 are plan views showing the way in which the device of FIG. 8 operates.

A locking device according to another embodiment of the present invention will be described with reference to FIGS. 8 through 12. In FIG. 8, the locking device is shown as being in a shutter-set position. The device comprises a locking lever or first lever 102 for a front shutter blade or leaf, the locking lever 102 having a bent end 102a and being pivotably mounted on a shaft 103 attached to a base plate 101. The locking lever 102 is normally urged by a return spring 104 to turn counterclockwise into abutting engagement with a stopper 105 on the base plate 101, the spring 104 acting between the locking lever 102 and a second lever 106 for the front shutter blade. The second lever 106 has a bent portion 106a, an iron member 106b and a pin 106c, and is pivotably mounted on the shaft 103. The second lever 106 is normally urged by the spring 104 to turn clockwise into abutting engagement with an arm 141b of a lock or follower plate 141 described later on.

A driver lever 108 for the front shutter blade comprises a hooked end 108a and a pin 108b located adjacent thereto and extending through an arcuate slot 101a defined in the base plate 101 into operative engagement with the front shutter blade disposed behind the base plate 101. The driver lever 108 is angularly movably mounted on a shaft 109 projecting from the base plate 101, and is normally urged by a spring 110 in a direction to swing counterclockwise, but is kept from such counterclockwise rotation by the bent end 102a of the locking lever 102 which engages the hooked end 108a of the driver lever 108. When the hooked end 108a is disengaged from the bent end 102a, the driver lever 108 is angularly moved counterclockwise under the resilience of the spring 110 into abutment against a pin 111 mounted on the base plate 101.

An electromagnet 112 for the front shutter blade comprises an iron core 113 secured to the base plate 101 and a coil 113 disposed around the iron core 113, the electromagnet 112 being positioned adjacent to the second lever 106.

The locking device also comprises a locking lever or first lever 122 for a rear shutter blade or leaf, the locking lever 122 having a bent end 122a and being pivotably mounted on a shaft 123 projecting from the base plate 101. The locking lever 122 is normally biased by a return spring 124 to turn counterclockwise into abutment against a pin 125 on the base plate 101, the spring 124 acting between the locking lever 122 and a second lever 126 for the rear shutter blade, which is pivotably mounted on the shaft 123. The second lever 126 has a bent portion 126a, an iron member 126b and a pin 126c which is normally held against an arm or actuator 141d of the lock plate 141 under the bias of the spring 124 which urges the lever 126 to swing in the clockwise direction.

A driver lever 128 for the rear shutter blade is pivotably mounted on a shaft 129 attached to the base plate 101 and has a hooked end 128a and a pin 128b located remotely from the hooked end 128a and projecting through an arcuate slot 101b defined in the base plate 101 into operative engagement with the rear shutter blade disposed behind the base plate 101. The driver lever 128 is normally urged by a spring 130 in a direction to turn counterclockwise, but is prevented from being thus turned counterclockwise by the bent end 122a of the locking lever 122 which engages the hooked end 128a of the driver lever 128. Upon disengagement of the hooked end 128a from the bent end 122a, the driver lever 128 is turned counterclockwise under the force from the spring 130 into abutment against a pin (not illustrated) projecting from the base plate 101.

The base plate 101 also supports thereon an electromagnet 132 located adjacent to the second lever 126 for the rear shutter blade and including an iron core 133 secured to the base plate 101 and a coil 134 disposed around the iron core 133.

The arms 141b, 141d of the lock plate 141 have slants 141a, 141c, respectively, and are spaced from each other longitudinally of the lock plate 141. The lock plate 141 has an arm or follower member 141e to be acted upon, and a pair of slots 141f, 141f defined respectively in ends of the lock plate 141. The slots 141f, 141f receive therein a pair of pins 142, 142, respectively, projecting from the base plate 101 for guiding up-and-down reciprocable movement of the lock plate 141. The lock plate 141 is normally biased by a spring 143 in a direction to move upwardly (FIG. 8) and is prevented from being moved upwardly by a stopper 144 when the latter is engaged by a lateral arm.

The arm 141e of the lock plate 141 is actuatable by a suitable means which is movable before an exposure operation is started and which is returnable upon termination of the exposure operation. Such a means may comprise a member which is lockable in response to depression of a release button and which is releaseable upon closing of shutter blades, or a member ganged with a quick return mirror mechanism, the latter being employed by way of example for the initiation of operation.

The locking device thus constructed will operate as follows: When the release button (not shown) of the camera in which the locking device is incorporated is depressed while the parts are in the position of FIG. 8, a quick return mirror mechanism is released to lift a mirror, causing the arm 141e and hence the lock plate 141 to be moved downwardly to the position shown in FIG. 9 against the force of the spring 143. The arms 141b, 141d are retracted out of engagement with the pins 106c, 126c, respectively, to allow the levers 106, 126 to move angularly clockwise under the bias of the springs 104, 124, respectively, until the bent portions 106a, 126a abut against the locking levers 102, 122, respectively.

Figure 10:
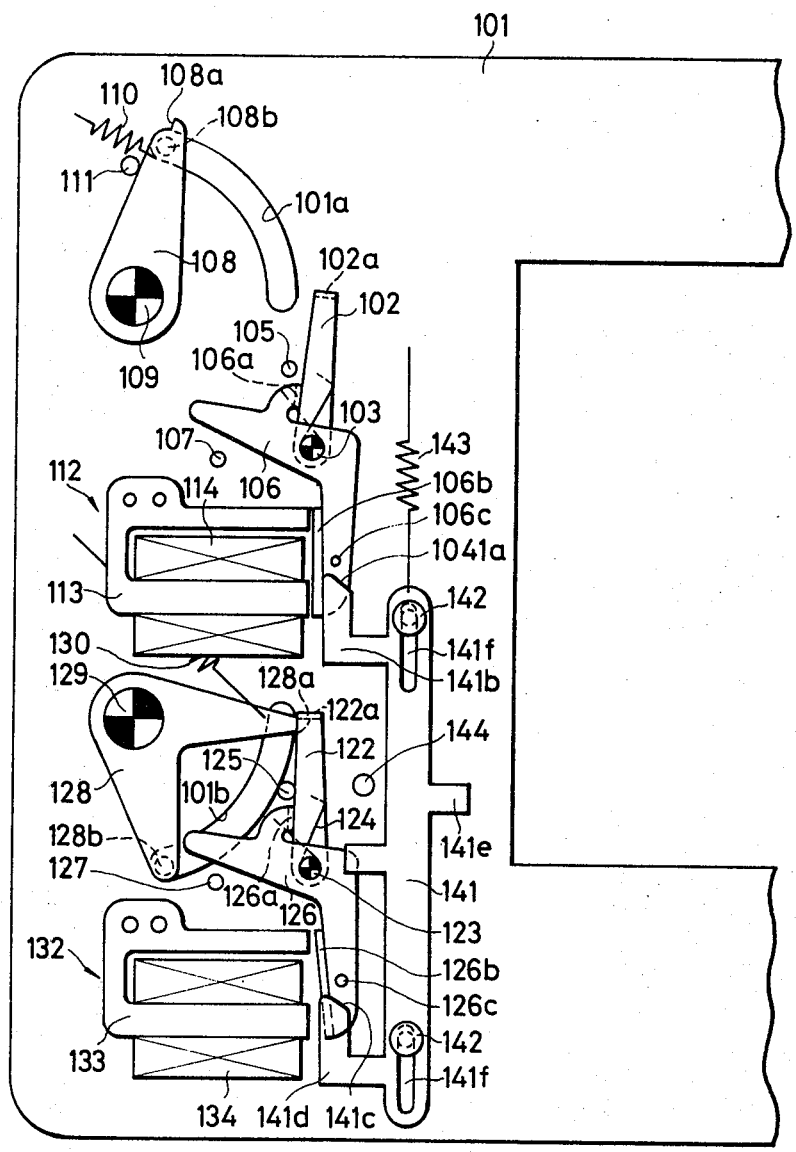

A switch is actuated in response to the mirror's being lifted to energize a delay circuit, which generates a pulse signal after a quite short period of time. The pulse signal energizes the electromagnet 112 momentarily, attracting the iron member 106b as shown in FIG. 10. The lever 106 is turned clockwise to cause the bent portion 106b to push the locking lever 102 clockwise until the hooked end 108a of the driver lever 108 is disengaged from the bent end 102a of the locking lever 102. As a result, the driver lever 108 is swung counterclockwise under the tension of the spring 110, whereupon the pin 108b actuates the front shutter blade. The aperture is now opened to start an exposure operation.

Figure 11:
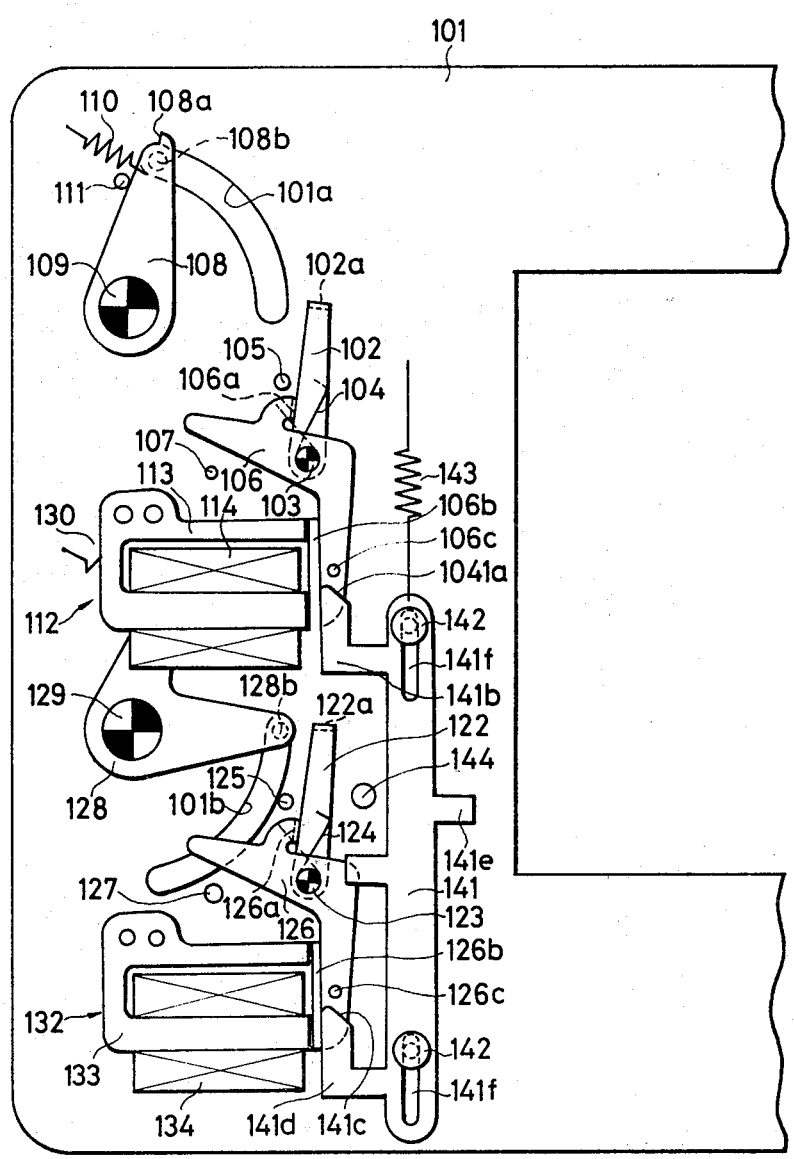
Figure 12:
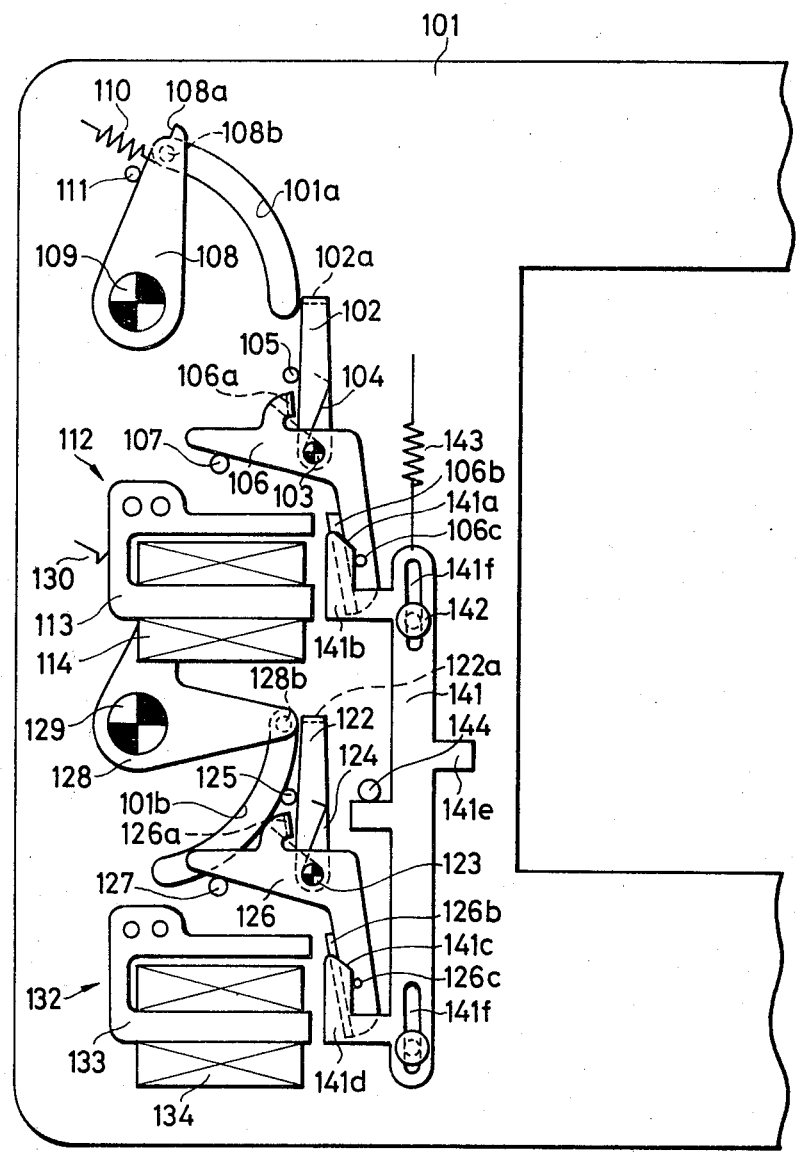

Upon elapse of a correct exposure time, the electromagnet 132 is now energized momentarily to attract the iron member 126b, thus angularly moving the lever 126 clockwise as shown in FIG. 11. Clockwise movement of the lever 126 enables the bent portion 126a to push the locking lever 122 also in the clockwise direction, disengaging the bent end 122a from the hooked end 128a. Then, the driver lever 128 is permitted to turn counterclockwise under the tension of the spring 130, whereupon the pin 128b actuates the rear shutter blade. The aperture is now closed, and the exposure operation is completed.

In response to a signal indicative of finishing of the exposure operation, or counterclockwise movement at a final stage of the driver lever 128, the mirror mechanism is actuated to lower the mirror, whereupon the arm 141e is released of the force it has been subjected to. The lock plate 141 is now caused by the spring 143 to move upwardly until engaged by the stopper 144. The slants 141a, 141c of the arms 141b, 141d are also moved upwardly into engagement with the pins 106c, 126c, respectively. Continued upward movement of the lock plate 141 causes the slants 141a, 141c to displace the pins 106c, 126c laterally, turning the levers 106, 126 counterclockwise. The pins 106c, 126c now ride on the sides of the arms 141e, 141d, respectively. At this time, the levers 106, 126 are also brought into engagement with stoppers 107, 127 mounted on the base plate 101, whereupon the levers 106, 126 are prevented from being angularly moved either clockwise or counterclockwise. As the levers 106, 126 are angularly moved counterclockwise, the locking levers 102, 122 are also angularly moved counterclockwise under the force of the springs 104, 124 until engaged by the stoppers 105, 125. The locking levers 102, 122 are now in a position ready for engagement with the driver levers 108, 128.

After the picture has been taken, the film is wound for setting the shutter, whereupon the driver levers 108, 128 are angularly moved clockwise against the tension of the springs 110, 130, respectively. On clockwise movement of the driver levers 108, 128, the hooked ends 108a, 128a push at their back the bent ends 102a, 122a laterally causing the locking levers 102, 122 to turn clockwise. When the hooked ends 108a, 128a get past the bent ends 102a, 122a, the locking levers 102, 122 are caused by the springs 104, 124, respectively, to turn counterclockwise into abutting engagement with the pins 105, 125. The force with which to set the shutter is now removed to allow the driver levers 108, 128 to turn counterclockwise until the hooked ends 108a, 128a are brought into engagement with the bent ends 102a, 122a, a position in which the shutter is set as shown in FIG. 8.

With the arrangement according to the second embodiment, the locking levers 102, 122 and the levers 106, 126 as they are unlocked by the lock plate 141 are freely movable under no resistive force whatsoever, and hence can be attracted with a relatively small attractive force by the electromagnets 112, 132. While the lock plate 141 holds the levers 106, 126 in the locked position, the locking levers 102, 122 are securely prevented from being accidentally released due to shock or vibration. The driver levers 108, 128 are protected against accidental operation. Furthermore, the lock plate 141 provides easy operative connection to other camera parts.

Figure 13:
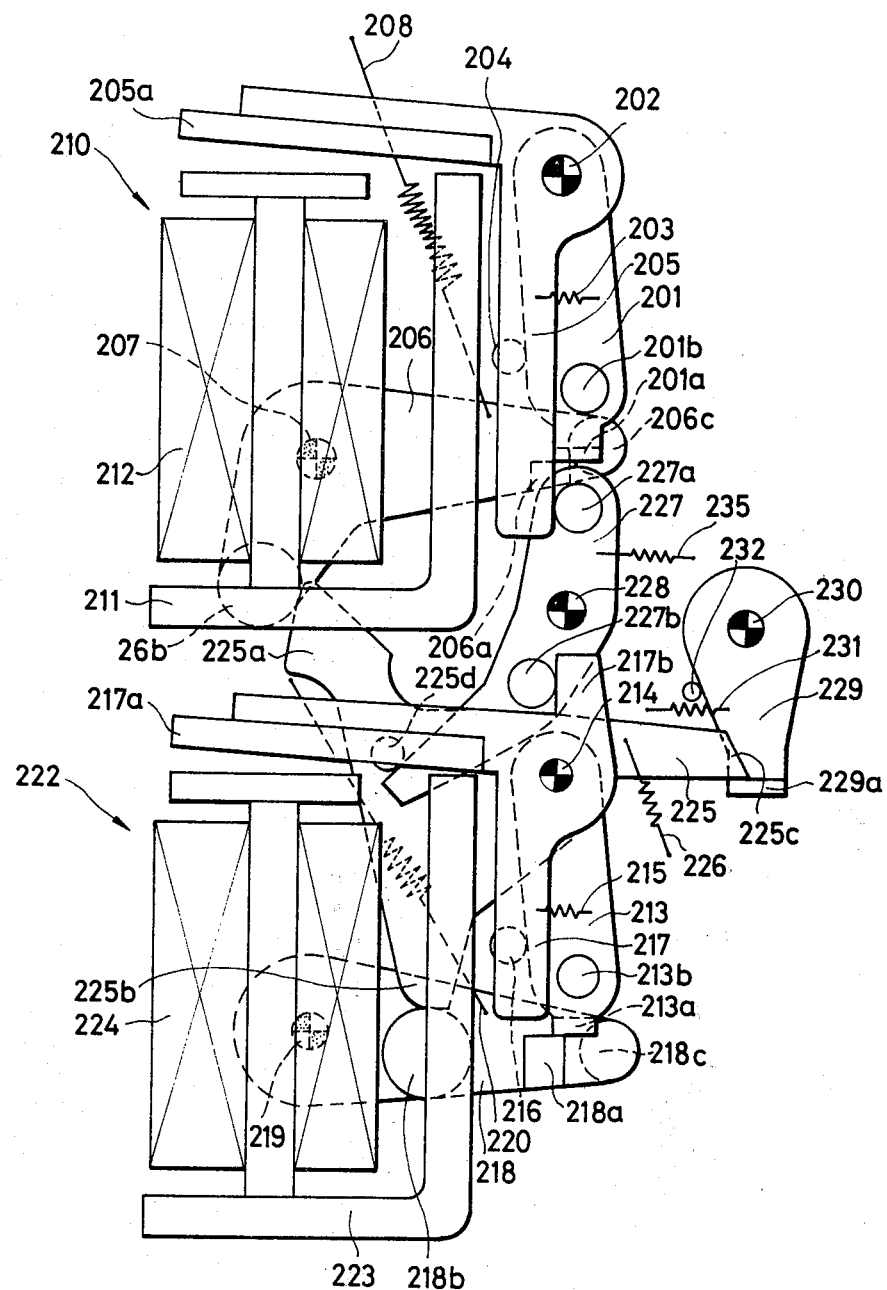
FIG. 13 is a plan view of a blade driver locking device according to still another embodiment.

FIG. 13 illustrates a locking device constructed in accordance with still another embodiment of the present invention, the parts being shown to be in position in which the shutter is set.

The locking device comprises a locking lever 201 for a front shutter blade, which has a bent end 201a and a pin 201b located adjacent thereto. The locking lever 201 is angularly movably mounted on a shaft 202 projecting from a base plate (not shown). The locking lever 201 is normally urged by a return spring 203 to turn clockwise into engagement with a stopper 204 mounted on the base plate, the spring 203 acting between the locking lever 201 and another lever 205 for the front shutter blade. The lever 205 has an iron member 205a and is pivotably mounted on the shaft 202. The spring 203 normally urges the lever 205 to turn counterclockwise into abutment against a pin 227a on a retainer lever 227 described later on.

A driver lever 206 for the front shutter blade is pivotably mounted on a shaft 207 projecting from the base plate and has an engagement member 206a and a pair of pins 206b, 206c located remotely from each other. The pin 206c projects through an arcuate slot (not shown) defined in the base plate into operative engagement with the front shutter blade disposed behind the base plate. The driver lever 206 is normally biased by a spring 208 in a direction to turn counterclockwise, but is held in the position illustrated by the engagement member 206a engaging the bent end 201a of the locking lever 201. Disengagement of the engagement member 206a from the bent end 201a permits the driver lever 206 to turn counterclockwise under the bias of the spring 208 into abutting engagement with a stopper (not shown) mounted on the base plate.

An electromagnet 210 for the front shutter blade comprises an iron core 211 secured to an intermediate plate (not shown) installed on the base plate and a coil 212 disposed around the iron core 211.

A locking lever 213 for a rear shutter blade has a bent end 213a and a pin 213b located adjacent thereto and is angularly movably mounted on a shaft 214 projecting from the base plate. The locking lever 213 is normally urged by a return spring 215 to turn clockwise into abutting engagement with a stopper 216 mounted on the base plate, the spring 215 acting between the locking lever 213 and another lever 217 for the rear shutter blade. The lever 217 is pivotably mounted on the shaft 214 and has an iron member 217a and an arm 217b. The lever 217 is normally urged by the spring 215 in a direction to turn counterclockwise with the arm 217b held against a pin 227b on the retainer lever 227.

A driver lever 218 for the rear shutter blade is pivotably mounted on a shaft 219 projecting from the base plate and has an engagement member 218a and a pair of pins 218b, 218c, the pin 218c extending through an arcuate slot (not shown) defined in the base plate into operative engagement with the rear shutter blade disposed behind the base plate. The driver lever 218 is normally urged by a spring 220 in a direction to turn counterclockwise, but is held in the position illustrated by the engagement member 218a engaging the bent end 213a of the locking lever 213. When the engagement member 218a is disengaged from the bent end 213a, the driver lever 218 is allowed to turn under the tension of the spring 220 into abutment against a non-illustrated stopper mounted on the base plate.

An electromagnet 222 for the rear shutter blade comprises an iron core 223 fixed to the intermediate plate and a coil 224 disposed around the iron core 223.

A shutter charging lever 225 is pivotably supported on the shaft 214 for keeping the driver levers 206, 218 in a shutter charging or setting position, the lever 225 being normally urged by a spring 226 in a direction to turn clockwise. The shutter charging lever 225 has an arm 225a engageable with the pin 206b on the driver lever 206, an arm 225b engageable with the pin 218b on the driver lever 218, and an arm 225c engageable with a bent end 229a of a retainer lever 229. The lever 225 also has a pin 225d engageable with the retainer lever 227 to turn the latter counterclockwise until it retains the levers 205, 217 in position.

The retainer lever 227 is pivotably mounted on a shaft 228 projecting from the base plate and is normally urged by a spring 235 to angularly move clockwise.

The retainer lever 229 is angularly mounted on a shaft 230 on the base plate for keeping the shutter charging lever 225 and is normally biased by a spring 231 into abutment against a stopper 232 on the base plate.

Operation of the locking device thus constructed is as follows: When the release button (not shown) of the camera having the locking device is depressed, a release member (not shown) is actuated to turn the retainer lever 229 counterclockwise against the bias of the spring 231 until the bent end 229a is displaced out of engagement with the arm 225c of the shutter charging lever 225, whereupon the latter is caused by the spring 226 to turn clockwise. As the pin 225d angularly moves clockwise, the retainer lever 227 is angularly moved clockwise under the force of the spring 235, allowing the levers 205, 217 to turn counterclockwise into engagement with the pins 201b, 213b, respectively, on the locking levers 201, 213 under the bias of the springs 203, 215, respectively. The springs 203, 215 are designed such that they will no longer urge the levers 205, 217 and the locking levers 201, 213 toward each other upon engagement of the levers 205, 217 with the pins 201b, 213b, respectively.

Continued depression of the release button actuates a switch (not shown), which then energizes an exposure control circuit to supply a pulse signal to the electromagnet 210. The electromagnet 210 is energized momentarily to attract the iron member 205a on the lever 205, which is turned counterclockwise to displace the pin 201b on the locking lever 201 until the bent end 201a thereof is disengaged from the engagement member 206a. The driver lever 206 is now permitted to turn counterclockwise under the bias of the spring 208, whereupon the pin 206b actuates the front shutter blade to open the aperture, thereby starting an exposure operation.

As a correct exposure time has elapsed, the electromagnet 222 is now energized momentarily to attract the iron member 217a, turning the lever 217 counterclockwise. Counterclockwise movement of the lever 217 causes the pin 213b and hence the locking lever 213 to turn counterclockwise until the bent end 213a on the locking lever 213 is displaced out of locking engagement with the engagement member 218a. The driver lever 218 is turned counterclockwise under the force of the spring 220, actuating the rear shutter blade with the pin 218c. The aperture is now closed to finish the exposure operation.

As the electromagnet 222 is energized momentarily, the lever 217 is turned counterclockwise until the iron member 217a is held against the iron core 223 under the attractive force. At this time, the locking lever 213 however overruns or is turned counterclockwise excessively, charging or storing energy in the spring 215. The locking lever 213 is then turned clockwise under the force from the spring 215 until the locking lever 213 abuts against the stopper 216. The lever 217 is now caused by the pin 213b on the locking lever 213 to turn slightly clockwise. Although not described for brevity, the locking lever 201 and the lever 205 also undergo such movements upon momentary energization of the electromagnet 210.

After the picture has been taken, a shutter charging operation is effected in response to winding of the film, angularly moving the shutter charging lever 225 counterclockwise against the bias of the spring 226. As the shutter charging lever 225 angularly moves counterclockwise, the arms 225a, 225b engages and pushes the pins 206b, 218b, respectively, on the driver levers 206, 218, which are turned clockwise against the bias of the springs 208, 220 until the engagement members 206a, 218a respectively on the driver levers 206, 218 are locked by engagement with the bent ends 201a, 213a, respectively, of the locking levers 201, 213. At the same time, the arm 225c of the shutter charging lever 225 is retained by the bent end 229a of the retainer lever 229. Thus, the shutter is charged for a next exposure operation.

Counterclockwise movement of the shutter charging lever 225 causes the pin 225d thereon to angularly move the retainer lever 227 in the counterclockwise against the force of the spring 235 until the pins 227a, 227b on the retainer lever 227 engage and retain the levers 205, 217, respectively, in their shutter setting position.

When the parts are in the position illustrated, the engagement members 206a, 218a on the driver levers 206, 218 may be spaced slightly from the bent ends 201a, 213a, respectively, of the locking levers 201, 213. Such an alternative arrangement allows the locking levers 201, 213 to be easily returned to their starting position without being obstructed by the engagement members 206a, 218a after the locking levers 201, 213 have accidentally swung counterclockwise due to shock or vibration.

As an alternative, the shutter charging lever 225 and the retainer lever 227 may be of an integral construction. While in the illustrated embodiment of FIG. 13 the shutter charging lever 225 is kept charged by the retainer lever 229 before the shutter is released, the shutter charging lever 225 may be ganged with a quick return mirror mechanism so as to be retained in position.

The locking device according to the embodiment shown in FIG. 13 is advantageous in that the shutter charging lever 225 remains charged before the shutter is released, retaining the locking levers 201, 213 against accidental displacement and hence against accidental releasing of the driver levers 206, 218. Thus, the shutter mechanism remains securely set until and unless the release button is depressed.

Although some preferred embodiments have been shown and described in detail, it should be understood that various changes and modifications may be made therein without departing from the scope of the appended claims.

What is claimed is:

1. A blade driver locking device for use with an electronic shutter in a camera, comprising:
   a base;
   a driver mounted on said base for actuating a shutter blade;
   a locking member mounted on said base for locking said driver against movement to actuate the shutter blade;
   an electromagnet mounted on said base and energizable for attracting said locking member out of locking engagement with said driver; and
   means mounted on said base and actuatable in one direction prior to starting of an exposure operation and in an opposite direction upon completion of the exposure operation for retaining said locking member against movement to unlock said driver while said means is at rest before and after being actuated.

2. A blade driver locking device according to claim 1, said means comprising a member operatively associated with a quick return mirror in the camera.

3. A blade driver locking device according to claim 1, said means comprising a member operatively associated with a release button in the camera.

4. A blade driver locking device for use with an electronic shutter, comprising:
   a base;
   a driver lever pivotably mounted on said base for actuating a shutter blade;
   a locking lever assembly pivotably mounted on said base for locking said driver lever in a set position against movement to actuate the shutter blade;
   an electromagnet mounted on said base and energizable for attracting said locking lever assembly out of locking engagement with said driver lever;
   a quick return mirror mechanism mounted on said base and movable to an upward position prior to starting of an exposure operation and to a downward position in response to completion of the exposure operation;
   a lock member movably mounted on said base and operatively associated with said quick return mirror mechanism; and
   said locking lever assembly including a first lever having an engaging portion engageable with said driver lever and a second lever having an iron member attractable by said electromagnet, said first and second levers being operatively coupled with each other by a return spring, said driver lever being lockable in the set position by said locking lever assembly when said second lever is engaged by said lock member while said quick return mirror mechanism is in the downward position.

5. A blade driver locking device for use with an electronic shutter in a camera, comprising:
   a base;
   a driver mounted on said base for actuating a shutter blade;
   a locking member assembly mounted on said base for locking said driver against movement to actuate the shutter blade;
   an electromagnet mounted on said base for attracting said locking member assembly out of engagement with said driver;
   a follower reciprocably mounted on said base and normally urged to move in one direction, said follower having an actuator member and a follower member;
   said locking member assembly including a first member having an engaging portion and a second member having a member attractable by said electromagnet, said first and second members being operatively coupled with each other by a return spring, said driver being lockable by said locking member assembly when said second member is engaged by said actuator member while said follower is at rest; and
   said follower member being actuatable by a reciprocable member in the camera which is movable in one direction prior to starting of an exposure operation and in an opposite direction upon completion of the exposure operation, said follower being movable, by the reciprocable member moving in said one direction, in a direction opposite to said first-mentioned one direction to release said locking member assembly rendering the latter ready for attraction by said electromagnet, and said follower being movable, by the reciprocable member moving in said opposite direction, in said first-mentioned one direction to cause said actuator member to return said locking member assembly to a position capable of locking said driver.

* * * * *